US006062066A

United States Patent [19]

Loen

[11] Patent Number: 6,062,066

[45] Date of Patent: May 16, 2000

[54] METHOD FOR DETERMINING EMPTY VOLUME OF FUEL TANK

[75] Inventor: Andrew Everett Loen, Port Alberni, Canada

[73] Assignee: Shell Oil Company, Houston, Tex.

[21] Appl. No.: 08/614,443

[22] Filed: Mar. 12, 1996

Related U.S. Application Data

[63] Continuation of application No. 08/461,277, Jun. 5, 1995, abandoned.

[51] Int. Cl.[7] .................... G01M 3/02

[52] U.S. Cl. .................... 73/37

[58] Field of Search .................... 73/149, 290 B, 73/49.7, 37, 40, 49.2, 49.3; 141/5, 39, 40, 192, 198, 83

[56] References Cited

U.S. PATENT DOCUMENTS

| | | | |
|---|---|---|---|
| 2,162,180 | 6/1939 | Odier . | |
| 3,568,775 | 3/1971 | Greenberg et al. . | |
| 3,580,414 | 5/1971 | Ginsburgh et al. | 220/86 |
| 3,744,306 | 7/1973 | Krueger | 73/149 |
| 4,808,161 | 2/1989 | Kamen | 73/149 |
| 4,971,121 | 11/1990 | Guertin | 141/198 |
| 5,001,924 | 3/1991 | Walter et al. | 73/149 |
| 5,121,777 | 6/1992 | Leininger et al. | 141/207 |
| 5,131,441 | 7/1992 | Simpson et al. | 141/209 |
| 5,245,870 | 9/1993 | Hartel et al. | 73/149 |
| 5,355,863 | 10/1994 | Yamanaka et al. . | |

*Primary Examiner*—Robert Raevis
*Attorney, Agent, or Firm*—Del S. Christensen

[57] ABSTRACT

A method is provided for determining, prior to initiating filling of a fuel tank, the volume of the fuel tank that does not contain liquid, the method comprising the steps of: placing a vapor supply conduit in sealing relationship to the fuel tank; injecting a known volume of vapor through the vapor supply conduit into the fuel tank; measuring the amount the known volume of vapor increases the pressure of the fuel tank; and determining the volume of the tank that does not contain liquid from the known volume of vapor, and the measured amount of pressure increase. In preferred embodiments this method also determines if the fuel tank is equipped with a canister for removal of hydrocarbons from vapors displaces by fuel, and if the fuel tank has a leak by analysis of the rate at which pressure decreases after injection of the vapor. The method is also preferably used as a step in a method of automated refuelling of a vehicle.

1 Claim, 2 Drawing Sheets

METHOD FOR DETERMINING EMPTY VOLUME OF FUEL TANK

This is a continuation of application Ser. No. 08/461,277 filed Jun. 5, 1995, now abandoned.

FIELD OF THE INVENTION

This invention relates to a method for determining, prior to initiating filling of a fuel tank, the volume of the tank that does not contain liquid.

BACKGROUND OF THE INVENTION

Numerous apparatuses have been proposed for preventing over-filling of fuel tanks. The most common used method is an automatic cut-off within a nozzle. Typically this automatic cut-off uses a vapor path from the nozzle outlet back to a venturi around the fuel flow path within the nozzle. A sufficiently high pressure must be maintained at a point within this path to indicate that vapor is being drawn into the vapor path rather than liquids. When liquids enter the vapor path, the pressure drop in the path increases, and the pressure at the sensor point will decrease. When this pressure decreased below a threshold pressure, the fuel flow is cut-off, usually by a mechanical trip. As a back-up to this fuel cut-off switch, fuel pumps with a vapor recovery system usually also include a fuel cut-off triggered by high level of amperage being drawn by a vacuum pump drawing vapors from the fuel tank. This system is undesirable because fuel will fill a considerable volume of the vapor recovery system prior to the vacuum pump drawing a high level of amperage. The shut-down is therefore considerably slower than what would be desired, resulting volumes of liquid hydrocarbons to be contended with to prevent the hydrocarbons from being unwanted emissions.

It is therefore an object of the present invention to provide a method for determining the volume of a fuel tank that is not occupied by liquid. In another aspect it is an object to provide such a method that can be used in conjunction with a refuelling process to minimize or eliminate any emissions of fuel caused by splash-back when the tank fills.

SUMMARY OF THE INVENTION

These and other objects of the present invention are achieved by a method for determining, prior to initiating filling of a fuel tank, the volume of the fuel tank that does not contain liquid, the method comprising the steps of: placing a vapor supply conduit in sealing relationship to the fuel tank; injecting a known volume of vapor through the vapor supply conduit into the fuel tank; measuring the amount the known volume of vapor increases the pressure of the fuel tank; and determining the volume of the tank that does not contain liquid from the known volume of vapor, and the measured amount of pressure increase. The known amount of gas can be determined after the gas is injected by, for example, measurement of the time it takes to increase the pressure of the fuel tank by a predetermined amount while a constant flowrate of gas is being injected.

In preferred embodiments this method also determines if the fuel tank is equipped with a canister for removal of hydrocarbons from vapors displaces by fuel, and if the fuel tank has a leak by analysis of the rate at which pressure decreases after injection of the vapor. The method is also preferably used as a step in a method of automated refuelling of a vehicle. Splash back can be minimized or eliminated by reducing the rate at which fuel is injected into the tank to a slow rate as the cumulative volume of fuel injected approaches the initial volume of the tank that did not contain liquids. This method can be applied to either automated refuelling systems, or with typical manual refuelling systems that are equipped with vapor recovery systems that include providing a seal between the nozzle and the fuel tank inlet.

DETAILED DESCRIPTION OF THE INVENTION

Figure 1:
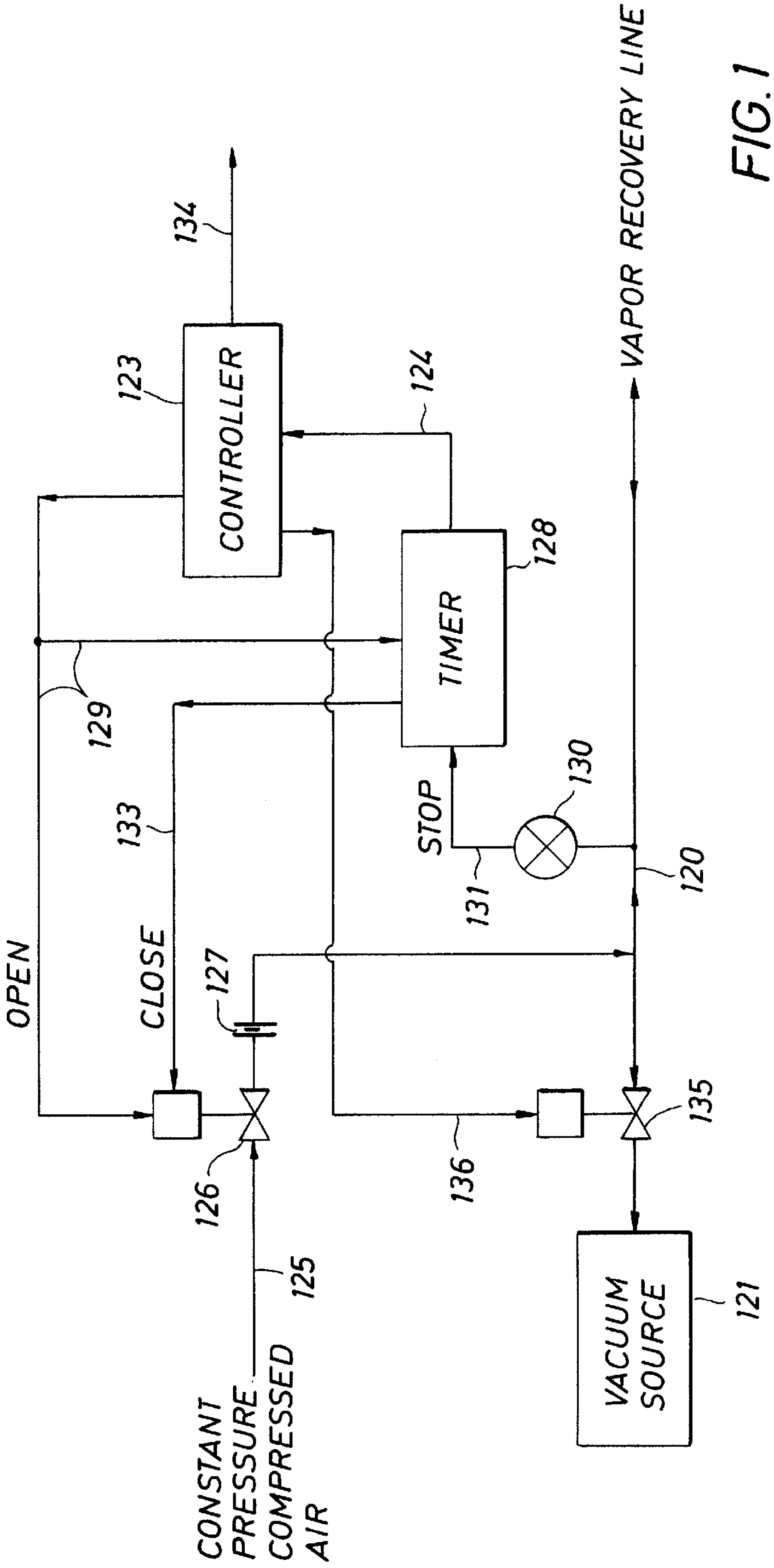
FIG. 1 is a schematic drawing of a system for the practice of the present invention.

Gasoline refilling stations are typically equipped with vapor recovery systems to reduce emissions of hydrocarbon vapors during refilling of motor vehicles. Such systems vary in their details, but usually comprise a vapor line either concentric around a fuel line, or a second tube extending to near a fuel outlet nozzle. Vapors are drawn through the vapor line at a rate that slightly exceeds the volumetric rate at which gasoline is pumped through the fuel line. A portion of the vapors removed from the vehicle's fuel tank are routed back to the fuel storage tank at the filling station to minimize the amount of vapor eventually vented to the atmosphere.

It is also common for a fuel nozzle to be equipped with a seal that mates with a vehicle's fuel inlet to ensure that gasoline vapors do not escape from the fuel tank, and to provide a closer balance between the amount of vapor removed from the vehicle's fuel tank and the amount of vapor needed to maintain pressure in the fuel storage tank at the filling station.

Such vapor recovery systems would also typically include a valve to isolate the vapor recovery system from the vapor recovery line. This valve permits a single source of vacuum to provide vapor recovery for a plurality of fuel pumps.

It is a simple and relatively inexpensive modification to an existing filling station vapor recovery system to provide a means to inject gas into a vehicle's fuel tank through a vapor recovery conduit and measure the amount that the pressure of the tank, as measured through the vapor recovery conduit, increases. Alternatively, a constant flowrate of gas could be injected and the time required for the pressure of the fuel tank to increase to a predetermined pressure measured.

The empty volume of the fuel tank can then be used to trigger a slow-down on the pump when the empty volume is approached, similar to a slow-down often used when the amount of fuel to be purchased is approached when less than a full tank is purchased.

The empty volume of a fuel tank is calculated from a measured pressure increase caused by a known amount of injected vapor from Boyle's Law:

$$V = \frac{znRT}{P} \tag{1}$$

P is pressure, z is the compressibility factor (equal to about unity at the low pressures of the present application), n is the number of moles of gas, and T is absolute temperature.

The temperature of the volume of gas in the fuel tank does not change significantly as a result of the addition of the known amount of gas, so a measured ambient temperature can be used without a significant loss of accuracy. Alternatively, a typical ambient temperature can be used if it is desired to measure the empty volume only to an accuracy of five to ten percent of the volume.

The compressibility factor, z, is very close to unity at low pressures and temperatures for gases such as nitrogen and oxygen, and can therefore be neglected in the application of Boyle's law in the present invention.

Boyle's Law, applied to an initial state, and to a state after a known amount of gas is added to the fuel tank, Δn, for a constant V, for a gas compressibility factor of unity, therefore yields:

$$V = \frac{\Delta nRT}{P_2 - P_1} \tag{2}$$

Because $P_1$ is one atmosphere, $P_2-P_1$ is simply the gauge pressure measured after injection of the known amount of gas.

The known amount of gas injected is preferably only enough to raise the pressure of the fuel tank by about one to five inches of water, and preferably one to three inches of water. Such pressures are readily measured by commercially available pressure transducers and pressure sensors, and will not damage fuel tanks.

In a preferred embodiment of the present invention, a constant pressure source of compressed air is provided with a quick-opening solenoid valve to supply air from the source of compressed air to the vapor recovery conduit. An orifice is provided downstream from the solenoid valve to provide an essentially constant flow rate of gas. The orifice is preferably provided very close to the solenoid valve because a very small amount of gas is needed to raise the pressure of the empty tank by one to five inches of water, and it is preferable to not have a large volume of higher pressure gas between the solenoid valve and the orifice that will expand into the fuel tank after the solenoid valve is closed. A pressure sensor is preferably provided on the vapor recovery conduit close to the fuel tank. An initiating signal will open the solenoid valve and start a timer, and when the pressure sensor detects a predetermined pressure, the timer is stopped, and the solenoid valve is closed. The empty volume of the fuel tank is essentially proportional to the timer output after the timer is stopped.

Figure 2:
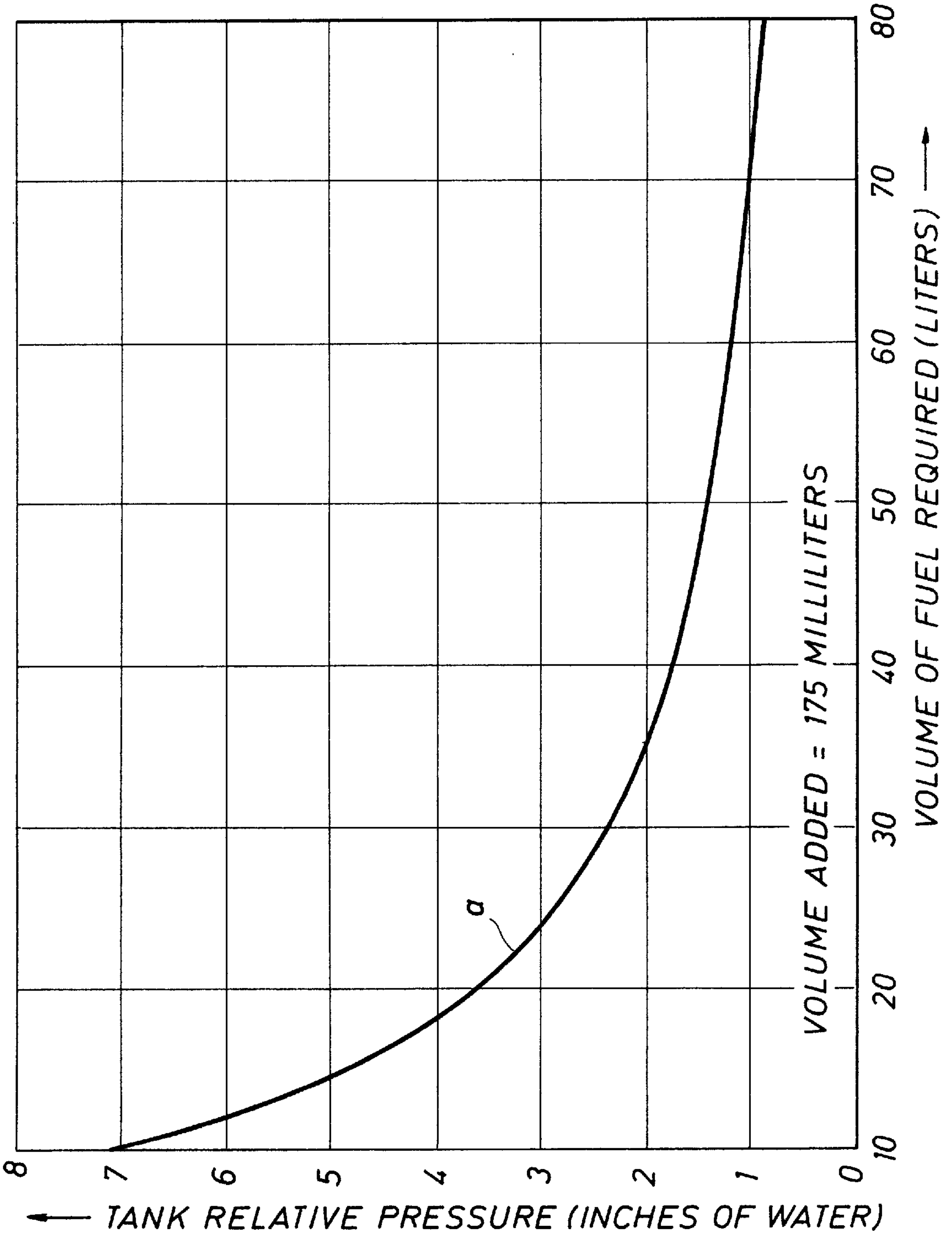
FIG. 2 is a plot of pressure increase as a function of empty volume for injection of 175 ml of ambient condition air.

Referring now to FIG. 2 a plot of pressure increase as a function of empty volume is shown for injection of 175 ml of air at standard temperature and pressure. Line a in the plot showns that, for example, 175 ml of standard condition air would raise the pressure of a fuel tank having about 23.9 liters of empty volume by about 3 inches of water. Thus, a volume such as this would raise the pressure of a fuel tank by a reasonably measurable pressure. For the preferred embodiment of the present invention, where the time is measured for an increses in pressure while air is injected at a constant rate, the time would be porportional to the empty volume. With a known rate of injection of air, the empty volume for a 3 inches of water pressure increase could be calculated by multiplying the time in seconds by the injection rate, in standard ml per second, by 23.9 divided by 175, or about 0.137.

When a customer interface having visual or aural communication capability is used with a gasoline refilling station incorporating the method to determine the empty volume of a fuel tank according to the present invention, the result of the empty volume determination is preferably displayed to the customer as refuelling is initiated.

The method to determine the empty volume of a fuel tank according to the present invention is preferably used with a system to automatically refuel vehicles. In automated refuelling systems, redundant methods to prevent over filling of fuel tanks are desirable, and the method of the present invention can provide one of a plurality of methods to prevent over filling of fuel tanks.

Referring now to FIG. 1, a schematic drawing of a system to determine the empty volume of a fuel tank in a refuelling system having a vapor recovery system is shown. A vapor recovery line 120 provides communication from the fuel tank (not shown) to a vacuum source 121. An vapor recovery line solenoid valve 135 is capable of separating the vacuum source from the vapor recovery line so that a positive pressure can be exerted in the vapor recovery line for the purpose of determining the empty volume of the fuel tank. A controller 123 coordinates movement of valves and calculates the empty volume from a timer input 124. A line supplies a constant pressure of compressed air 125 to a solenoid valve 126. An orifice 127 is provided downstream of the solenoid valve so that an essentially constant flow rate of air passes from the constant pressure source of compressed air to the vapor recovery line when the solenoid valve is open.

The controller initiates measurement of a fuel tank's empty volume when triggered, for example, by a customer initiate refuelling a vehicle. The controller 123 provides a signal that simultaneously opens the solenoid valve 126 and starts a timer 128. A signal 129 is shown from the controller 123 to both the solenoid valve 126 and the timer 128 to initiate the measurement. A pressure sensor 130 senses the pressure on the vapor recovery line at a location that is preferably as close as practical to the fuel tank to minimize error caused by hydraulic pressure drop between the pressure sensor and the fuel tank. The pressure sensor 130 generates a pressure signal 131 when a predetermined pressure is reached in the vapor recovery line. This pressure signal stops the timer. The resultant elapsed time between the start of the timer and the stopping of the timer is communicated to the controller 123 by time signal 124.

The controller multiplies the elapsed time signal by a constant that represents the constant rate of compressed air that passes through the orifice, preferably in gallons per second at ambient temperature and pressure. When the elapsed time is in seconds, this product is the empty volume of the tank in seconds. A measurement complete signal from the timer 133, or the controller can be provided to close the solenoid valve after the elapsed time. The timer or the controller may also cause the solenoid valve to close after a predetermined time that indicates that a sufficient seal is not achieved between the vapor recovery line and the inlet of the fuel tank.

A second pressure sensor could also be provided that generates a signal when the pressure of the vapor recovery line decreases to below a predetermined limit, for example one or two inches of water. The elapsed time between the first pressure sensor indicating the predetermined pressure, and the second pressure sensor indicating that the pressure has decreased to the second pressure could be used as an indication that either the fuel tank being equipped with a vapor recovery canister or the fuel tank has a leak. For any particular canister design, a time for the pressure to decrease from the set point of the first pressure sensor to the set point of the second pressure sensor could be calculated based on the canister's design, or determined empirically. The existence of the canister can therefore be detected by this time being close to the expected time difference. A time difference for the pressure to decrease between these two pressures that is less than a predetermined time, say three seconds, and different than the time expected if a canister were present, would be indicative of the fuel tank having a leak.

After the controller 123 receives a signal 124 from the timer the controller can calculate the empty volume and generate an empty volume signal 134. This empty volume signal can be used, for example, to generate a communication to a customer and/or to set a limit on the amount of fuel dispensed into the fuel tank. After the controller has generated the empty volume signal 134, the controller can generate a signal 136 to permit opening of a vapor recovery line solenoid valve 135. The vapor recovery line solenoid may require that other conditions be satisfied to be opened, such as fuel flow being initiated.

The method of the present invention has been described in connection with a vehicle refuelling system, but the method is broadly applicable to may other systems as can be seen by a person of skill in the art.

A preferred automated refuelling system and method for use with the method of the present invention is disclosed in U.S. patent application Ser. Nos. 08/461,276, 08/461,280, and 08/461,281 incorporated herein by reference.

The foregoing descriptions of preferred embodiments are exemplary, and reference is made to the following claims to determine the full scope of the present invention.

I claim:

1. A method for determining, prior to initiating filling of a fuel tank, the volume of the fuel tank that does not contain liquid, the method comprising the steps of:

placing a vapor supply conduit in sealing relationship to the fuel tank;

injecting a known volume of vapor through the vapor supply conduit into the fuel tank;

measuring the amount the known volume of vapor increases the pressure of the fuel tank;

determining the volume of the tank that does not contain liquid from the known volume of vapor, and the measured amount of pressure increase; and determining if the fuel tank is equipped with a vapor recovery canister by measuring a rate at which the pressure of the fuel tank decreases after the vapor is injected, and determining that the fuel tank is equipped with a vapor recovery canister if the rate at which the pressure of the fuel tank decreases after the vapor is injected is within a range of rates that would result if the fuel tank were equipped with a canister.

* * * * *